United States Patent [19]

Traina

[11] Patent Number: 5,394,759
[45] Date of Patent: Mar. 7, 1995

[54] AUTOMATED FLOW MEASURING DEVICE

[75] Inventor: John E. Traina, Glenshaw, Pa.

[73] Assignee: United Sciences, Inc., Gibsonia, Pa.

[21] Appl. No.: 48,273

[22] Filed: Apr. 14, 1993

[51] Int. Cl.[6] ............................................. G01F 1/46
[52] U.S. Cl. ................................................ 73/861.67
[58] Field of Search ........... 73/861.65, 861.67, 170.14, 73/182, 3; 364/510

[56] References Cited

U.S. PATENT DOCUMENTS

| | | | |
|---|---|---|---|
| 2,706,409 | 4/1955 | Preston | 73/861.67 |
| 3,977,249 | 8/1976 | Witting | 73/861.67 |
| 4,163,387 | 8/1979 | Schroeder | 73/182 |
| 4,476,729 | 10/1984 | Stables | 73/861.61 |

FOREIGN PATENT DOCUMENTS 2231667A 11/1990 United Kingdom.

OTHER PUBLICATIONS

Technisches Messen Tm, vol. 48, No. 6, Jun. 1981, Munchen De, pp. 229–232, J. Wachter, E. A. "Automatischer Nullabgleich For Stromungssonden".

Patent Abstracts of Japan, vol. 9, No. 250 (P-394) (1973) 8 Oct. 1985 & JP-A-60 102 564 (Kobe Seikosho) 6 Jun. 1985.

Richard L. Myers and Donald Vernon, "Field Experiences Using Dilution Gas Probe Techniques for Continuous Source Emission Monitoring," *Proceedings of the Controls West Conference*, pp. 347–355, submitted to the International Industrial Controls Conference and Exhibition/Controls West '85, Long Beach Convention Center, Long Beach, Calif., Sep. 16–18, 1985.

"Model 797: Diluting Stack Sampler," *EPM Environmental Product Brochure*.

"Inertial Dilution System: A-120" product announcement.

Appendix A, Methods 1 and 2 of 40 Code of Federal Regulations, Part 60, Jul. 1, 1992.

*Primary Examiner*—Richard E. Chilcot, Jr.
*Assistant Examiner*—Harshad Patel
*Attorney, Agent, or Firm*—Buchanan Ingersoll; Lynn J. Alstadt

[57] ABSTRACT

A probe for measuring fluid velocity through a conduit has a pitot tube connected to a multiple channel cylindrical tube which is placed within a tubular housing. Drive motors are provided to permit precise rotation and longitudinal movement of the cylindrical tube and attached pitot tube in the conduit, typically a stack or duct. At least one differential pressure gauge is connected to the cylindrical. A computer directs movement of the cylindrical tube, receives differential pressure and static pressure readings from the differential pressure gauge and utilizes that data to calculate flow of the fluid through the conduit. The device is particularly useful for measuring stack gas flow which flow can be utilized to determine emissions of pollutants.

16 Claims, 3 Drawing Sheets

AUTOMATED FLOW MEASURING DEVICE

FIELD OF INVENTION

The invention relates to a method and apparatus for measuring stack gas velocity and volumetric flow rate which is useful for emissions monitoring.

BACKGROUND OF THE INVENTION

The federal government of the United States has promulgated test methods in 40 CFR Part 60, Appendix A for determining stack gas velocity and volumetric flow rate. If one knows the flow rate and has another monitor which measures the concentration of pollutants in a selected volume of fluid one can calculate the quality of pollutants emitted over any selected time period. Accordingly, the methods have been used in various ways, including the verification of the performance of continuous emission monitoring equipment required by other rules.

The United States has additional regulatory requirements in the form of 40 CFR, Parts 72 through 75 (acid rain reduction), which utilize the Appendix A methods. Some recent regulations now require many electric utilities to continuously measure emissions of specified pollutants on a mass per unit time basis. Adoption of these rules has put a new importance on the errors in both the continuous monitor and in the referenced test methods. The new regulations give monetary value in the form of trading credits to a ton of $SO_2$ emissions. The value of such emissions is such that for large utilities as much as $1,000,000 per percent error in measured emissions may result.

The methods of Appendix A were introduced into law over 20 years ago. They, in general, use simple laboratory apparatus and techniques to make the various measurements. Unfortunately, the methods are error prone and tests under the same conditions often yield different results. There are many sources of error related to the care, speed and experience of the personnel performing the method as well as variability of the test hardware itself. In addition, the method makes compromises for practical reasons which further expand the margin of error. Over the years, the need to reduce the errors in these methods have been the subject of much discussion and little action.

Appendix A of Title 40 of the United States Code of Federal Regulations contains two methods for measuring flow which are used to determine compliance with emission regulations. These methods, known as EPA methods 1 and 2, have gained prominence because they are used to determine the proper location, as well to verify the performance of continuous measuring flow monitors. Errors in method 2 data can be very costly to both the supplier of the monitor and the utility. The supplier is affected because the method can erroneously show the monitor is not meeting the performance guarantee. The utility is affected because the method is used to adjust the continuous monitor. If the method is in error, that error will directly cause an enormous high or low use of the utility's $SO_2$ allowance and $SO_2$ trading credits.

The present invention automates much of method 2. It removes several sources of potential error while also removing certain compromises necessitated by the manual method.

Method 2 typically uses a type S (also called S-type) pitot tube made to specific dimensions. Method 2 refers to Method 1 to define the points at which the pitot tube must be placed in the stack or duct to be tested. The square rooted differential pressure is measured at these points is then averaged to yield the flow rate of the fluid through the conduit. After certain checks, the pitot tube is extended into the stack or duct to the points determined in Method 1. At each point the tester measures the static pressure in the stack and a differential pressure reading. The differential pressure reading is an average of several readings taken at that point. The person doing the test is expected to position the probe so that the pitot tube openings are at the points required by Method 1. In addition, the tester is expected to align the probe with the direction of flow. Unfortunately, each tester is left to his own skill and resourcefulness to accomplish this task. Frequently, the probe is positioned along the longitudinal axis of the conduit and pressure readings are taken when the actual direction of flow is at some angle to she longitudinal axis. The tester is then expected to determine the differential pressure created across the pitot tube from the flow velocity. The method calls for an inclined monometer, but substitutes are allowed and often used. The square root of this pressure is proportional to the flow velocity. The method asks the tester to simply read the pressure and introduce a damping device should the scale be too difficult to read. In any case, the tester is averaging a pressure reading with his eye using unknown skill. However, to fairly determine flow velocity from pressure readings, it is not the pressure reading but rather the square root of the pressure that should be used. To do otherwise introduces significant error.

As the tester proceeds through the test procedure, he is asked to return again and again to the same measurement points with the same alignment of the probe. No position tolerance is provided in the method as an acceptable limit. Unfortunately, the tolerance required to limit the velocity determination to a specific level of error changes as a function of the stack and the type of flow patterns, as well as the skill of the tester.

The tester is often asked to place the pitot tube many feet into the stack or duct. It is not uncommon to see the end of the probe move considerably as a result of the turbulent gas flow. This movement can result in significant error. Such error is conjunctive to error caused by the fact that pressure is averaged and not the square root of the pressure.

In addition to all this, the tester is asked to rotate the probe so as to obtain directional information about the flow of each measurement point. No tolerance limit is applied to this procedure. Finally, the method relies almost exclusively on the tester's subjective judgments and hand-written notes. There is no method of automatically storing real-time data for subsequent retrieval and analysis.

Hence, there is a need for a procedure in which the EPA methods and particularly EPA method 2 are automated. Such a technique will assure both reliability and repeatability of the test results.

SUMMARY OF THE INVENTION

The present invention is a probe which preferably has three basic components, a probe assembly, an interface assembly, and a computer or microprocessor. Preferably the probe assembly is a two axis control system which is used to drive a rigidly constructed precision type S pitot tube assembly. Such an assembly is shown in FIG. 2. An embodiment using a three-dimensional pitot tube assembly is also within the scope of the invention. In either case, the probe is moved in and out of a conduit, typically a stack or duct, along one axis. The probe rotates around the other axis so that a null may be found where the differential pressure is at a minimum. The pressure reading at the null is considered to be the static pressure of the conduit. A drive system for the probe is controlled by a computer. The computer will calculate the points at which the pitot tube is to be positioned for testing and will output signals to a stepper drive which will move the probe to each test point in the proper angular orientation.

The use of the device with a three-dimensional probe is essentially identical with respect to the motion control and hardware. All that is required is reading three additional pressure measurements.

The interface assembly (FIG. 4) contains a differential pressure transducer which converts the pressure into a voltage or current signal. Several transducers may be placed in parallel, in order to cover a wider range of pressure. The interface assembly contains a multiplexed analog to digital converter (A/D). The A/D output is read by %he computer through its parallel port. Through the use of the various analog and status inputs, the following information will be read: differential pressure, static pressure, temperature, calibration checks, pressure checks, case temperature, leak check status, and barometric pressure. The computer will calculate the velocity $V_s$ using Equation 2-9 of EPA Method 2 which is $$v_s = K_p C_p (\sqrt{\Delta p})(avg) \sqrt{\frac{T_{s(avg)}}{P_s M_s}}$$

where:
  $K_p$ = pitot tube constant
  $C_p$ = pitot tube coefficient
  $\Delta P(avg)$ = average of the differential pressure readings
  $T_{s(avg)}$ = average stack temperature
  $P_s$ = static stack pressure
  $M_s$ = molecular weight of the stack gas The gas concentration will be manually input into the computer by the user so that the molecular weight may be determined.

After all the required measurement points are measured, the overall velocity (average) at all points will then be used in the computer to calculate first the actual volumetric flow, then the standard volumetric flow as follows:

$$F_{vol} = V_s A$$

where:
  $F_{vol}$ = average actual volumetric flow rate
  $A$ = cross sectional area of conduit The average stack gas dry volumetric flow rate is found from Equation 2-10 of Method 2 which is:

$$Q_{SD} = 3600(1 - B_{ws}) v_s A \left( \frac{T_{STD}}{T_{s(avg)}} \right) \left( \frac{P_s}{P_{STD}} \right)$$

where:
  $Q_{SD}$ = average stack dry volumetric flow rate at standard conditions
  $B_{ws}$ = water vapor in the gas stream
  $T_{std}$ = absolute stack temperature
  $T_{s(avg)}$ = average stack temperature
  $P_{std}$ = standard absolute pressure For wet conditions the following equation is used to calculate flow rate:

$$Q_{SDW} = 3600 \left( \frac{T_{STD}}{T_{s(avg)}} \right) \left( \frac{P_s}{P_{STD}} \right) V_s A$$

where:
  $Q_{SDW}$ = average stack wet volumetric flow rate at standard conditions A spread sheet type output showing the input, measured and calculated variable values will be available. A typical computer will be capable of storing the data on floppy and/or hard disk. The computer should also be capable of sending the data to a printer or other location via modem. The direct interface with the tester is through the display and keyboard. A "lap top" type computer is considered most appropriate.

DESCRIPTION OF THE PREFERRED EMBODIMENTS

Figure 1:
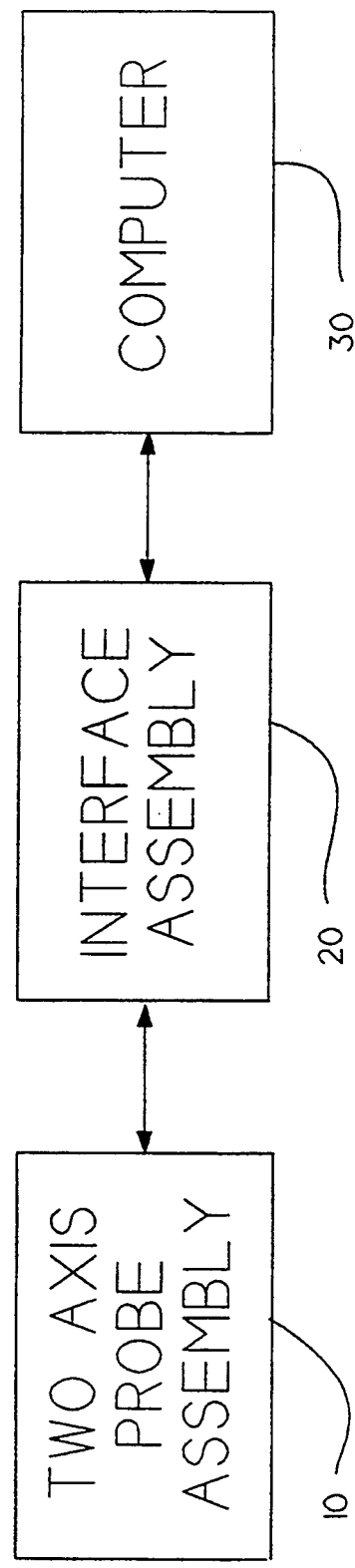
FIG. 1 is a block diagram of a the basic system of the present invention.

As shown in FIG. 1 my system is comprised of a probe assembly 10, an interface assembly 20 and a computer or microprocessor 30. Although this embodiment shows a probe with a two-dimensional type S pitot tube, a three-dimensional pitot tube may also be used. Almost any type of computer or microprocessor capable of storing and processing data can be used. I prefer to use a lap top computer which can be carried to the monitoring site.

Figure 2:
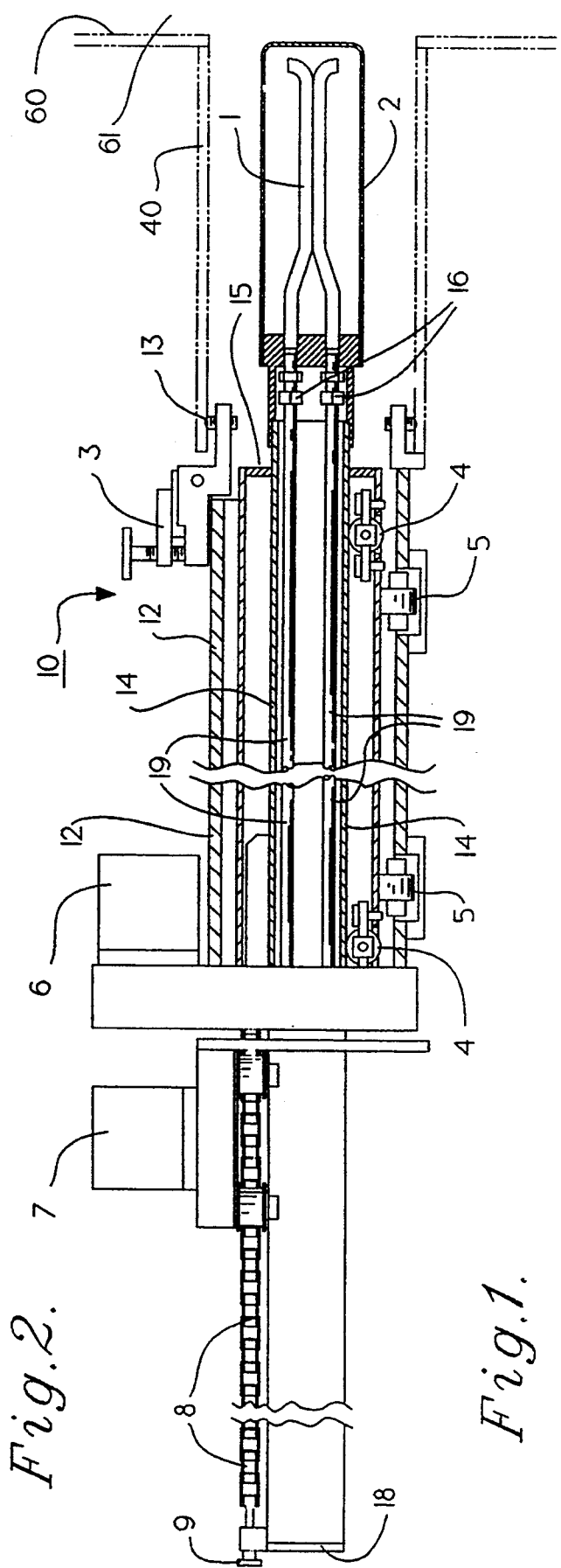
FIG. 2 is a side view partially in section of the two axis probe assembly.

FIG. 2 shows my present preferred probe assembly 10. The probe assembly 10 has a tubular housing 12. A two channel cylindrical tube 14 runs through the housing 12. A pitot tube 1 is attached to the end of the cylindrical tube 14. I prefer to use a four foot cylindrical tube, but other lengths up to 12 feet are acceptable. A cover 2 fits over the pitot tube for transport which cover is removed prior to the probe being inserted into the stack. A clamp assembly 3 with cone pointed set screw 13 and seal 15 allow the housing 12 of probe assembly 10 to be mounted in a port 40 in conduit 61 typically will be a stack or duct. The cylindrical tube 14 is advanced into and withdrawn from the stack by motor 7. I prefer to use a chain drive 8 that is attached at both ends and held with tension by the tensioning means 9. A friction drive may also be used in conjunction with a friction driven position sensor. The probe cylindrical tube 14 rolls linearly on the roller assemblies 4. This inner assembly may also rotate on roller assemblies 5. Rotation of cylindrical tube 14 is performed by a stepper motor 6. The stepper motor 6 and cylindrical tube drive motor 7 permit precise positioning of the pitot tube relative to the probe housing. Since the housing is clamped to the stack at known points relative to the stack and the housing, it is easy to determine the position of the pitot tube within the stack. Furthermore, the probe assembly can be removed and later attached to the stack in the same manner. Hence, tests can be repeated over time with the assurance that data is always being collected from the same points within the stack.

Figure 3:
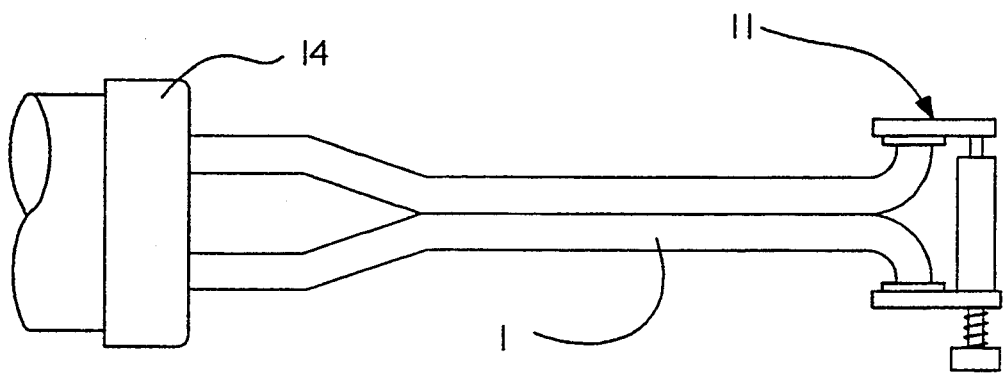
FIG. 3 is a side view of a pitot tube having a leak check device mounted thereon.
Figure 4:
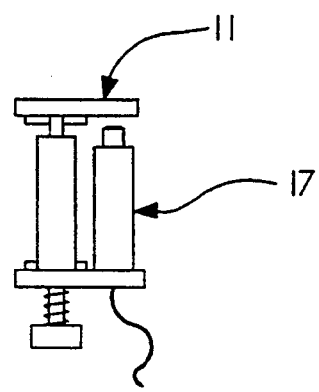
FIG. 4 is a front view of the leak check device.

Pressure gauges or other types of monitoring devices can be connected within the probe assembly as indicated by connections 16 or may be connected to the output end 18 of cylindrical tube 14. Seal 15 keeps gases from blowing back into the probe assembly and test area. I also provide a leak check device 11 shown in FIGS. 3 and 4 which can be clamped over the pitot tube openings. When this device is in place causing switch 17 to be activated, my system will execute the leak check.

Figure 5:
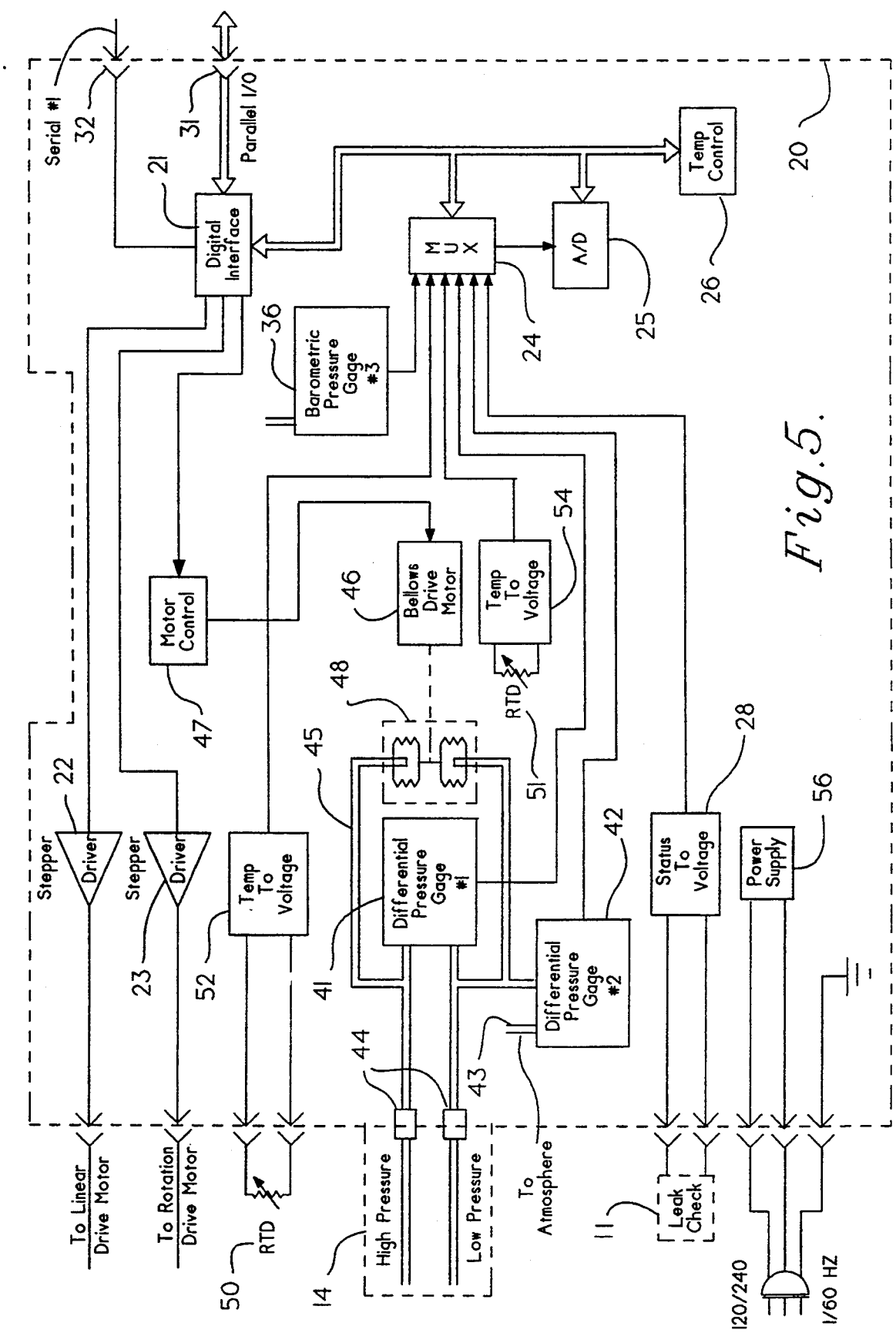
FIG. 5 is a schematic drawing of an interface assembly used in a present preferred embodiment of the invention.

A schematic of a present preferred interface assembly for a probe assembly with S-type pitot tube is shown in FIG. 5. The probe interface assembly 20 is connected to the computer 30 by serial port 32 and parallel port 31. These connections permit sorted and measured data to flow between the computer and the interface assembly. I prefer to provide differential pressure gauges 41 and 42 which connect to channels 19 of cylindrical tube 14 by connectors 44. The second gauge 42 preferably has a vent 43. Within the piping system 45 for the pressure gauges I also prefer to provide bellows 48 with associated drive motor 46 and motor control 47. I also prefer use to a resistive temperature device (RTD) 50 and 51 with associated temperature-to-voltage converters 52 and 54 for measuring stack and case temperature. A third pressure gauge 36 is used as a barometer. The case temperature will be used in conjunction with temperature control 26 to keep the case temperature at or near a constant temperature, preferably 120° F. A multiplexer 24 receives input from these monitors. An analog to digital converter 25 is connected to the multiplexer 24. A temperature controller 26, digital interface 21 along with the multiplexer 24, and A/D converter 25 form a digital buss. The digital interface 21 connects this buss and other lines to the computer through parallel input/output port 31. I also prefer to provide a monitor 28 which connects to switch 17 and emits a voltage whenever a leak check is to be done. Finally, a power supply 56 may also be provided in the interface assembly.

Operation

A tester will bring the equipment to the test area. The equipment consists of the probe assembly, the interface assembly and the computer. The tester will connect power and ground to the system. The computer contains a program which will ask for several lines of information. The type of information requested normally will include:
 Name of tester;
 Date of test;
 For whom service was provided;
 Site name;
 Site location;
 Site contact person;
 Number of test ports;
 Probe serial number; and
 Type of duct or stack.

The computer, through a number of menu drive questions, will require the tester to provide all the information needed to run the test. All this initial information will be stored and output with the test data to a printer, display memory, computer or modem for transfer to a remote processing or storage device such as a main computer system. The tester may recall the set-up information in the future should the same site and ports need to be tested.

The tester will perform the calibration check followed by the leak check of the system prior to placing the probe assembly into the stack. He will leak-check then calibration check at the end of the test. A calibration check against an oil monometer (see EPA Method 2) will be conducted prior to and immediately after each series of tests.

A calibration check will be performed before the hoses from the probe assembly are attached to the interface assembly. The ports where the hoses enter the interface assembly will be plugged during the calibration check. The calibration check will be executed from the computer keyboard. The computer will cause the bellows drive motor to activate, displacing a fixed volume of air in the closed system. This will produce a predictable pressure with the case temperature known. There will be various stops on the bellows for different calibration values. The computer will check for that pressure and will also have the ability to automatically correct the calibration of the gauge or gauges. The system will check for leaks in the interface assembly by checking for changes in the pressure readings over 15 seconds (typically). The computer will inform the tester of successful completions or types of failures in this test. A post calibration check will be compared to the internal calibration check. Should the calibration have drifted outside specified limits, the data will be automatically rejected.

The hoses to the probe will be attached following the successful completion of the calibration check. Both pitot openings will then be plugged by a leak check device 11 which has a switch 17 attached. The switch enclosure will tell the system to execute the leak check. The bellows drive motor 46 will activate causing a positive pressure to be imposed on the high pressure line and a low pressure to be imposed in the low pressure line.

The system will look for change of pressure over approximately 15 seconds. Should a change occur outside specified limits, the computer will inform the tester to find the leak and repeat the test. The system will not permit the tester to proceed with any other tests until the calibration and leak checks have passed.

The tester will then install the probe assembly into the test port 40. He will align the probe by placing it flush with the face of the port. The port will be required to be faced off parallel to the flow axis and flush with the inner wall 60 of the stack or duct 61. The port will also be required to have a mare or marks for angular alignment. Many other arrangements for establishing a reference for the probe assembly's position could be employed.

Operation of the probe is controlled by signals from the computer 30 to the interface 20. Referring to FIGS. 2 and 5, the computer will command the probe 10 to first extend into the stack or duct 61 to one of the desired locations. This is done by a signal which passes through interface 21 to stepper driver 22 which activates the drive motor 7 shown in FIG. 2. A second signal 31 through interface 21 and driver 23 causes the stepper motor 6 to rotate the probe by a desired amount. The digital interface will steer the signal to the proper driver 22 or 23. I prefer to provide a mechanical stop, then rotate again to another mechanical stop 220° away.

The differential pressure will be read by #1 gauge A voltage received from #1 gauge is applied to the multiplexer 24 where it will be switched to the analog to digital converter 25 in its turn. The digital representation of the voltage which corresponds to the pressure which was read will be presented to the digital interface 21. The computer will read the digital information from the digital interface. Other analog signals will be a read in a like manner. I prefer to have the computer determine the location of the minimum differential pressure (null) by a curve fitting routine after rotation from stop to stop. The probe will then be rotated to the null point so that differential pressure #2 gauge 42 will read the static pressure in the stack or duct. Note that this gauge is vented to atmosphere by vent 43.

The probe will then be rotated 90° in the direction which will face the high pressure side of the pitot tube directly into the flow. Since the system knows the direction of the flow axis, by being aligned when installed in the port, the system will calculated the angle between the actual flow and the flow axis. The calculated angle can be used to determine the actual fluid flow through the conduit. It is the actual flow through the conduit which must be determined to accurately determine emissions. The above method is superior to the typical way EPA Method 2 is run. The method above reduces errors resulting from non-axial flow. It also improves the readability of the flow since the differential pressure is typically maximum when the probe is pointed 90° from the null.

The pressure will be read by the system many times (selected by the tester) at each point. However, the pressure will not be averaged as it is called for by the reference method. The square root of each reading will be averaged instead. This process reduces errors which result from averaging pressure instead of averaging the square root of pressure. It is the square root of the differential pressure which is proportional to flow velocity. The temperature will be read at each point as well.

The probe will proceed from point to point repeating the measurements until the required number of points have been measured through that port. The computer will inform the tester to move the probe to the next port. The computer will also state when the test is complete and that a leak check and a calibration check are needed.

Because my probe assembly is clamped to the stack in a consistent manner and movement of the pitot tube is computer controlled, my system can provide consistent and repeatable results. Because my assembly is easy to install, there is little margin for human error. Moreover, a user friendly program can be provided to assure that all necessary data is collected and stored, thus eliminating uncertainties and errors from manual recording of "eyeball" data-taking.

Although I have described and shown certain present preferred embodiments of my invention, it should be distinctly understood that the invention is not limited thereto, but may be variously embodied within the scope of the following claims.

I claim:

1. A probe for measuring fluid flow through a conduit, the conduit having a port through which the probe is inserted and to which the probe is attached comprising:
    a) a tubular housing sized to be removably attached to a port of the conduit;
    b) a mounting device attached to the tubular housing for removably attaching the probe to the port at a selected point, removing the probe, and subsequently reattaching the probe to the port at the selected point;
    c) a multiple channel cylindrical tube located within the housing and sized for longitudinal movement into and out of the housing, the cylindrical tube having ports for connection of at least one monitoring device;
    d) a pitot tube rigidly attached to one end of the cylindrical tube, the pitot tube being suitable for insertion into the conduit;
    e) a linear drive motor attached to the housing and engaging the cylindrical tube for moving the cylindrical tube longitudinally through the tubular housing to position the pitot tube at selected positions within the conduit;
    f) a rotational drive motor engaging the cylindrical tube for rotating the cylindrical tube; and
    g) bellows and associated drive means, the bellows being connected to the multiple channel cylindrical tube.

2. The probe of claim 1 also comprising at least one differential pressure gauge connected to the cylindrical tube, which gauge outputs a signal corresponding to a differential pressure at the pitot tube.

3. The probe of claim 1 also comprising:
    a) a linear driver connected to the linear drive motor;
    b) a rotational driver connected to the rotational drive motor; and
    c) an interface connected to the at least one of the linear driver and the rotational driver, the interface having a port for connection to a computer.

4. The probe of claim 3 also comprising a computer connected to the interface and containing a program for receiving and processing signals from the at least one pressure gauge to calculate flow rate.

5. The probe of claim 3 also comprising a resistive temperature device and associated temperature to signal converter connected to the interface.

6. The probe of claim 3 also comprising a multiplexer connected to the interface and at least one pressure gauge.

7. The probe of claim 1 wherein there are two differential pressure gauges.

8. The probe of claim 2 wherein the at least one differential pressure gauge is vented to atmosphere.

9. The probe of claim 1 also comprising a leak monitor connected to the multiple channel cylindrical tube.

10. The probe of claim 1 wherein the pitot tube is a type S pitot tube.

11. An automated probe comprising:
    a) a probe assembly comprised of
        i) a tubular housing sized to be inserted through a port of a conduit;
        ii) a mounting device attached to the tubular housing for removably attaching the probe to the port at a selected point, removing the probe, and subsequently reattaching the probe to the port at the selected point;
        iii) a multiple channel cylindrical tube located within the tubular housing, the multiple channel cylindrical tube having ports for connection of at least one monitoring device;

iv) a pitot tube rigidly attached to one end of the multiple channel cylindrical tube, the pitot tube being suitable for insertion into the conduit;

v) a linear drive motor attached to the housing and engaging the multiple channel cylindrical tube for moving the multiple channel cylindrical tube longitudinally through the housing; and vi) a rotational drive motor attached to the tubular housing and engaging the multiple channel cylindrical tube for rotating the multiple channel cylindrical tube;

b) an interface assembly comprising:

i) at least one differential pressure gauge connected to at least one port of the multiple channel cylindrical tube which gauge outputs a signal corresponding to a differential pressure reading;

ii) a linear driver connected to the linear drive motor;

iii) a rotational driver connected to the rotational drive motor;

iv) an interface connected to the at least one pressure gauge and the drivers;

c) a computer connected to the interface and containing a program for receiving and processing signals from the at least one pressure gauge to calculate flow rate; and d) bellows and associated drive means, the bellows being connected to the multiple channel cylindrical tube.

12. The automated probe of claim 11 wherein there are two pressure gauges.

13. The automated probe of claim 12 wherein one pressure gauge is vented to atmosphere.

14. The automated probe of claim 11 also comprising a resistive temperature device and associated temperature to signal converter connected to the interface.

15. The automated probe of claim 11 also comprising a multiplexer connected to the interface and at least one pressure gauge.

16. The automated probe of claim 11 also comprising a leak check device connected to the multiple channel cylindrical tube and the interface.

* * * * *

UNITED STATES PATENT AND TRADEMARK OFFICE
CERTIFICATE OF CORRECTION

PATENT NO. : 5,394,759
DATED : March 7, 1995
INVENTOR(S) : JOHN E. TRAINA

It is certified that error appears in the above-indentified patent and that said Letters Patent is hereby corrected as shown below:

At [57] Abstract, line 8, after "cylindrical", insert --tube--.

Signed and Sealed this

Eighteenth Day of July, 1995

Attest:

BRUCE LEHMAN

Attesting Officer     Commissioner of Patents and Trademarks